United States Patent
Roller et al.

(10) Patent No.: US 9,169,380 B2
(45) Date of Patent: Oct. 27, 2015

(54) USE OF AQUEOUS POLYMER DISPERSIONS FOR IMPROVING RESISTANCE TO CHEMICAL INFLUENCES

(71) Applicants: Sebastian Roller, Mannheim (DE); Rolf Dersch, Neustadt (DE); Uwe Dittrich, Dannstadt-Schauernheim (DE); Roelof Balk, Boehl-Iggelheim (DE); Bas Lohmeijer, Mannheim (DE); Ulrich Tromsdorf, Plankstadt (DE)

(72) Inventors: Sebastian Roller, Mannheim (DE); Rolf Dersch, Neustadt (DE); Uwe Dittrich, Dannstadt-Schauernheim (DE); Roelof Balk, Boehl-Iggelheim (DE); Bas Lohmeijer, Mannheim (DE); Ulrich Tromsdorf, Plankstadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/710,952

(22) Filed: Dec. 11, 2012

(65) Prior Publication Data

US 2013/0172483 A1 Jul. 4, 2013

Related U.S. Application Data

(60) Provisional application No. 61/570,839, filed on Dec. 15, 2011.

(51) Int. Cl.
*C08L 33/14* (2006.01)
*C09D 133/14* (2006.01)

(52) U.S. Cl.
CPC ............. *C08L 33/14* (2013.01); *C09D 133/14* (2013.01)

(58) Field of Classification Search
CPC .............................. C08L 33/14; C09D 133/14
USPC ........... 524/809, 831, 458, 460; 526/201, 203
See application file for complete search history.

(56) References Cited

U.S. PATENT DOCUMENTS

| | | | |
|---|---|---|---|
| 4,269,749 A | 5/1981 | Marriott et al. | |
| 2005/0256257 A1 | 11/2005 | Betremieux et al. | |
| 2006/0047055 A1* | 3/2006 | Agostini | 524/495 |
| 2006/0047065 A1 | 3/2006 | Becker et al. | |

FOREIGN PATENT DOCUMENTS

| | | |
|---|---|---|
| DE | 36 30 356 A1 | 3/1987 |
| DE | 39 02 067 A1 | 7/1990 |
| DE | 43 41 260 A1 | 5/1994 |
| DE | 43 34 178 A1 | 4/1995 |
| DE | 44 19 518 A1 | 12/1995 |
| DE | 44 35 422 A1 | 4/1996 |
| DE | 44 35 423 A1 | 4/1996 |
| EP | 0 288 763 A2 | 11/1988 |
| EP | 288763 A2 * | 11/1988 |
| EP | 0 379 892 B1 | 8/1990 |
| EP | 0 421 185 B1 | 4/1991 |
| EP | 0 609 756 A2 | 8/1994 |
| EP | 0 710 680 A2 | 5/1996 |
| EP | 1 418 192 A1 | 5/2004 |
| WO | WO 98/35994 A1 | 8/1998 |
| WO | WO 2004/003074 A1 | 1/2004 |
| WO | WO 2005/058993 A2 | 6/2005 |

* cited by examiner

*Primary Examiner* — Kelechi Egwim
(74) *Attorney, Agent, or Firm* — Oblon, McClelland, Maier & Neustadt, L.L.P.

(57) ABSTRACT

Coating compositions containing an aqueous polymer dispersion having improved resistance toward chemicals. The aqueous polymer dispersion is prepared by polymerizing a first composition containing at least one ethylenically unsaturated group (monomers) by radical aqueous emulsion polymerization and then, in the presence of a product mixture from the previous polymerization, polymerizing a second composition containing at least one ethylenically unsaturated group (monomers) by radical aqueous emulsion polymerization. The coating compositions are such that the difference between a glass transition temperature of a polymer prepared from the first polymerization and a glass transition temperature of a polymer prepared from the second polymerization is at least 50° C.

18 Claims, No Drawings

USE OF AQUEOUS POLYMER DISPERSIONS FOR IMPROVING RESISTANCE TO CHEMICAL INFLUENCES

Present invention relates to the use of an aqueous polymer dispersion obtainable by polymerizing a composition 1 of compounds containing at least one ethylenically unsaturated group (monomers) by the method of radical aqueous emulsion polymerization to a conversion of at least 90%, preferably at least 95%, and more preferably at least 98%, by weight, based on the monomer composition 1 to be polymerized (polymerization stage 1), and subsequently, in the presence of the product mixture from polymerization stage 1, polymerizing a composition 2 of compounds containing at least one ethylenically unsaturated group (monomers) by the method of radical aqueous emulsion polymerization (polymerization stage 2), with the proviso that a) composition 1 is such that random copolymerization of composition 1 alone would give a polymer 1 with a glass transition temperature $Tg1>0°$ C., preferably $>10°$ C., especially preferably $>20°$ C.,
b) composition 2 is such that random copolymerization of composition 2 alone would give a polymer 2 with a glass transition temperature $Tg2>80°$ C., more particularly $>100°$ C.,
c) the amount of the difference between Tg1 and Tg2 is at least 50° C.,
d) further to the monomers of compositions 1 and 2, at least one adhesion monomer, which is different from these monomers and comprises at least one ethylenically unsaturated group and the element nitrogen, is copolymerized in an amount of 0.1% to 10% by weight, preferably 0.5% to 5% by weight, especially preferably 1% to 3% by weight, based on the total amount of the monomers to be polymerized,
e) of the total amount of the adhesion monomers to be copolymerized as per d), 20 to 100 mol % are copolymerized in polymerization stage 1, and
f) the amount of the composition i that is accorded the lower limit value Tgi, based on the total amount of the compositions 1 and 2, is 60% to 90% by weight, preferably 70% to 85% by weight,
g) further to the monomers of compositions 1 and 2, at least one monomer which is different from these monomers and is selected from the group consisting of itaconic acid, acetoacetoxyethyl (meth)acrylate (AAEM), and acrylonitrile is copolymerized in an amount of 0.2% to 25% by weight, based on the total amount of the monomers to be polymerized, preferably in polymerization stage 1, for coating compositions having improved resistance toward chemical influences, more particularly having improved hand cream resistance.

Present invention further relates to coating compositions comprising the aqueous polymer dispersions, having improved resistance toward chemicals, more particularly having improved hand cream resistance.

Aqueous polymer dispersions are fluid systems comprising as their disperse phase polymer particles present in stable disperse distribution in the aqueous dispersing medium. Generally speaking, the diameter of the polymer particles is primarily in the range from 0.01 to 5 µm, often primarily in the range from 0.01 to 1 µm.

Like polymer solutions when the solvent is evaporated, aqueous polymer dispersions have the capacity when the aqueous dispersing medium is evaporated to form transparent polymer films, and for this reason aqueous polymer dispersions find application multivariously as binders, e.g., for paints or leather-coating materials.

Unlike the polymer solution, however, the matter of whether an aqueous polymer dispersion, after the water is evaporated, forms a coherent transparent film or else a brittle, turbid, pulverizable layer is formed, is dependent on the nature of the dispersed polymer and on the temperature at which film formation takes place. The lowest temperature at which a transparent, uncracked film is still just formed will be referred to hereinafter as the minimum film formation temperature (MFFT) of the aqueous polymer dispersion in question. Below the MFFT, no film forming is obtained (cf. Ullmanns Enzyklopädie der technischen Chemie, vol. 19, 4th edition, Verlag Chemie, Weinheim (1980), p. 17).

Two-stage acrylate dispersions which exhibit blocking resistance in combination with acceptable filming are known (EP 710 680).

Improved resistance toward chemicals, as for example improved hand cream resistance, is not described for these dispersions, however.

Handrails on stairs, doors, varnished trunks or other furnishings may be a decorative element of any home. After prolonged service, however, differences which are easy to perceive visually are noticed between those areas on a banister or a wooden lid that come into contact with the hand in daily use, and those parts of the furniture item with which there has been no contact. The frequent-contact areas are shiny, and are often "patchy" or dirty; in some cases the varnish is mechanically abraded. The cause is generally that hand cream, hand perspiration, and body fat on the frequent-contact surfaces soften the varnish and hence this varnish shows a tendency to become dirty. Here, solutions are needed which are more resistant than known systems to attacks by fat and dirt. Conventional acrylate varnishes are unsuitable here, since their fat resistance and resistance to hand perspiration are not optimal.

From a technical viewpoint, admittedly, solventborne alkyd varnishes, generally with heavy metal siccatives, are often an alternative, but are not a forward-looking, eco-friendly technology.

The advantages of polyurethane systems reside mostly in their surface mechanics. In isolated cases, improved fat resistance is described, but the high costs of this class of raw material impose limits on its use.

Economically acceptable acrylate systems having the requisite service properties can fill the gaps in the raw-material selection.

WO 98/35994 describes emulsion polymers for paint and coating applications with a combination of blocking resistance, water resistance, and ethanol resistance. The polymers are based on a monomer mixture comprising a monomer having a highly polar group (at least 0.5%, based on the mass of all the monomers, of carboxylated monomers, and at least 0.8%, based on the mass of all the monomers, of sulfonated monomers; cf. claim 1), a monomer having a hydrolyzable, silicon-containing unit, and a nonfunctional monomer. If less than 1.5%, based on the mass of all the monomers, of the silicon-containing monomer is used, the polymer additionally contains at least 0.1% of an at least diunsaturated crosslinker. The emulsion polymers may be prepared in two stages, in which case the first stage has a glass transition temperature of $<25°$ C. and the second stage has a glass transition temperature of $>60°$ C. The systems lead to good early strength and ultimate blocking resistance, without detraction from water resistance and solvent resistance, and result in coatings having adequate to excellent resistance with respect to water and to ethanol/water mixtures.

US 2005/0256257 describes aqueous polymer dispersions which can be obtained by polymerizing a mixture of monomers comprising a nonionic monomer, a carboxy-functional monomer, and a phosphorus-containing monomer. Furthermore, it is possible for silane-containing monomers, carbonyl-functional monomers or monomers which carry aldehyde-reactive functional groups, and OH— or amine-functional monomers to be used. The binders present are used for coatings for metal or plastic, more particularly as corrosion protection for metal substrates.

WO 2004/003074 describes dual-cure emulsions consisting of a dispersed polymer, containing acetoacetoxy-like functional groups with a glass transition temperature of 0-100° C., and of a polyfunctional acrylate. The aqueous composition further comprises a volatile base in an amount such that the acetoacetoxy-like functional groups are converted into the corresponding enamines. After UV curing, the coatings of the invention exhibit improved hand cream resistance relative to a comparative coating based on an acetoacetoxy-free dispersed polymer.

WO 2005/058993 describes a recyclable coating composition comprising a polyurethane polymer and also two differently defined vinyl polymers.

EP 1 418 192 describes nonaqueously dissolved, water-dispersible polyurethane resins with a high carbonate group content. The varnishes based on the water-dilutable, OH-group-containing polyurethane resin of the invention, in combination with polyurethane dispersions, have a significantly better suntan lotion resistance, in comparison to the use of the noninventive binders.

DE 3630356 describes synthetic-resin-coated metal pigments in which the metal particles are coated with a synthetic resin, for use in metal-coating materials. The synthetic-resin variations based on an at least triethylenically unsaturated monomer display advantages in terms of resistance to cosmetics and also to fingerprints.

None of the cited specifications teaches a way to improve the resistance toward chemicals, more particularly the hand cream resistance. Nor is there any connection established between glass transition temperature, shell ratio, monomers, etc., and the hand cream resistance.

It was an object of the present invention, therefore, to provide aqueous polymer dispersions which exhibit improved resistance toward chemicals, more particularly having improved hand cream resistance relative to aqueous polymer dispersions of the prior art.

Found accordingly has been the use of the above-defined aqueous polymer dispersions, which surprisingly, in relation to the prior-art polymer dispersions already known, exhibit improved resistance toward chemicals, more particularly improved hand cream resistance in coatings, more particularly in aqueous satin-gloss varnishes.

It is advantageous to use those aqueous polymer dispersions of the invention in which the amount of the monomer composition i which is accorded the lower limit value Tgi, based on the total amount of compositions 1 and 2, is 60 to 90, preferably 70 to 85. The amount of the difference between Tg1 and Tg2 is at least 50° C. In a way which is advantageous from a performance standpoint, the difference amount between Tg1 and Tg2 is 60 to 120° C. or 40 to 80° C.

It is favorable, furthermore, if the lower limit value Tgi is in the range >0 to >20° C.

In a corresponding way it proves favorable if the higher of the two limit values Tgi is in the region >80° C., preferably >100° C.

With a specified Tgi for the monomer composition i, the monomer composition i can be compiled in a simple way by means of the equation according to Fox. According to Fox (T. G. Fox, Bull. Am. Phys. Soc. (Ser. II) 1, 123 (1956) and Ullmanns Enzyklopädie der technischen Chemie, Verlag Chemie, Weinheim, 1980, vol. 19, 4th edition, p. 18), the glass transition temperature of random copolymers is given in good approximation by $$1/T_g = x^1 T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers composed in each case only of one of the monomers 1, 2, ... n, in degrees Kelvin.

Experimentally, the random copolymerization of a monomer composition i can be realized substantially by polymerizing a monomer mixture corresponding to said composition i in accordance with the feed process of the method of radical aqueous emulsion polymerization; in other words, the monomer mixture is emulsified in aqueous phase and is fed to the polymerization vessel at the rate of its consumption, with addition of initiators, in a manner such that the polymerization conversion of the monomers already present in the polymerization vessel is >99% by weight. Suitable initiators are preferably sodium peroxodisulfate, and the polymerization temperature is normally 60 to 90° C. Depending on monomers, the polymerization pressure may amount to >1 atm. Dispersants which can be employed are the substances recommended in this specification for the preparation of the aqueous polymer dispersions of the invention. The molecular weight can be adjusted in a conventional way by accompanying use of substances which regulate the molecular weight (chain transfer agents, e.g., mercaptan) and/or by the amounts of initiator used. In the absence of substances which regulate the molecular weight, and use of 0.1% to 2% by weight, based on the monomer amount, of polymerization initiator, it is possible to obtain an aqueous polymer dispersion whose glass transition temperature corresponds to the limit Tg.

Among the aqueous polymer dispersions of the invention, preference is given to those in which the polymerization stage 1 relates to the monomer composition which is accorded the lower limit value Tgi; in other words, in accordance with the invention, the preferred stage sequence is soft/hard.

Monomers contemplated for the synthesis of the monomer compositions 1 and 2 include, in particular, monoethylenically unsaturated radically polymerizable monomers such as styrene, α-methylstyrene, o-chlorostyrene or vinyltoluenes, esters of vinyl alcohol and monocarboxylic acids containing 1 to 18 C atoms, such as vinyl acetate, vinyl propionate, vinyl n-butyrate, vinyl laurate, and vinyl stearate, esters of α,β-monoethylenically unsaturated monocarboxylic and dicarboxylic acids containing preferably 3 to 6 C atoms, such as, more particularly, acrylic acid, methacrylic acid, maleic acid, fumaric acid, and itaconic acid, with alkanols containing generally 1 to 12, preferably 1 to 8, and more particularly 1 to 4 C atoms, such as, particularly, methyl, ethyl, n-butyl, isobutyl, tert-butyl, norobornyl, isobornyl, and 2-ethylhexyl acrylates and methacrylates, dimethyl maleate or n-butyl maleate, nitriles of α,β-monoethylenically unsaturated carboxylic acids such as acrylonitrile and methacrylonitrile, and also C4-8-conjugated dienes such as 1,3-butadiene and isoprene. Also of importance are commercially available monomers VEOVA® 9-11 (VEOVA X is a trade name of Shell and stands for vinyl esters (of carboxylic acids, which are also identified as Versatic® X acids)).

The major fraction of the monomer compositions 1 and 2, which, based on the respective monomer composition, unites within itself a fraction of more than 50% by weight, is generally recruited from the monomers specified above. Monomers which when polymerized themselves usually result in homopolymers having an increased water solubility are present, normally, only in modifying amounts in both monomer compositions. Based on the total amount of the respective monomer composition, such amounts are normally less than 50% by weight, generally less than 20% by weight, preferably 0.1% to 10% by weight, frequently also 0.1% to 5% by weight. Examples of such monomers are α,β-monoethylenically unsaturated monocarboxylic and dicarboxylic acids having 3 to 6 C atoms, and their amides, such as, for example, acrylic acid, methacrylic acid, maleic acid, fumaric acid, itaconic acid, acrylamide and methacrylamide, and also vinylsulfonic acid, acrylamidopropanesulfonic acid, and water-soluble salts of the aforementioned acids.

Preferably both monomer composition 1 and monomer composition 2 contain 0.1% to 5% by weight, based on the respective monomer composition i, of the aforementioned modifying monomers whose homopolymers have an increased water solubility.

With very particular preference, monomer composition 1 comprises itaconic acid and/or acetoacetoxyethyl methacrylate (AAEM) and/or acrylonitrile.

Besides the monomers already recited, the monomer compositions 1 and 2 may include minor amounts, generally 0.01% to 5% by weight, based on the respective monomer composition i, of those monomers which within the individual dispersed polymer particles bring about crosslinking of the polymer chains. Particularly suitable in this respect are monomers containing two or more nonconjugated ethylenically unsaturated groups, such as the diesters of dihydric alcohols with α,β-monoethylenically unsaturated monocarboxylic acids, among which in turn it is preferred to use the acrylic and methacrylic esters. Examples that may be recited include alkylene glycol diacrylates and dimethyacrylates such as ethylene glycol diacrylate, 1,3-butylene glycol diacrylate, 1,4-butylene glycol diacrylate, and propylene glycol diacrylate. Suitability is further possessed by divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. It is of course possible for monomer composition 1 and monomer composition 2 simultaneously to comprise such precrosslinking monomers. Sometimes, however, it is also favorable if only one of the two monomer compositions contains such precrosslinkers. Frequently they are only part of the first or of the second polymerization stage. Especially advantageous is their exclusive use in the hard polymerization stage. However, they may also be employed in location only in the soft polymerization stage.

Frequently it is favorable if at least one of the two monomer compositions, 1 and 2, or else both, comprise minor amounts, typically 0.5 to 5% by weight, based on the respective monomer composition i, of monomers which do not cause crosslinking until during film formation.

Examples include monomers containing carbonyl groups, such as acrolein, methacrolein, diacetoneacrylamide and diacetonemethacrylamide, and also vinyl acetoacetate. Aforementioned monomers produce postcrosslinking, for example, when the aqueous polymer dispersion at the same time includes a corresponding amount of an added polyamine compound. Suitable such compounds are in particular the dihydrazides of aliphatic dicarboxylic acids containing 2 to 10 C atoms. Examples of these are oxalic dihydrazide, malonic dihydrazide, succinic dihydrazide, glutaric dihydrazide, adipic dihydrazide or sebacic dihydrazide.

Another monomer which brings about postcrosslinking is, for example, 2-acetoacetoxy ethyl methacrylate (alone or in combination with polyamines or polyaldehydes such as glyoxal).

Additionally suitable for postcrosslinking are those polymer building blocks which have hydrolysable Si-organic bonds. Examples include the copolymerizable monomers methacryloyloxypropyltrimethoxysilane and vinyltrimethoxysilane. Other suitable polymer building blocks of corresponding kind are found in DE-A 43 41 260. Where the dispersed polymer particles have carboxyl groups, postcrosslinking may also be brought about through the addition of metal salts containing polyvalent cations (e.g. Mg, Ca, Zn or Zr salts).

Also suitable for the purpose of postcrosslinking are monomers containing epoxy, hydroxyl and/or N-alkylol groups, such as glycidyl acrylate, N-methylolacrylamide and N-methacrylamide, for example, and monoesters of dihydric alcohols and α,β-monoethylenically unsaturated carboxylic acids containing 3 to 6 C atoms, such as n-hydroxyethyl, n-hydroxypropyl or n-hydroxybutyl acrylate and methacrylate.

While the aqueous polymer dispersions of the invention comprise systems which bring about precrosslinking and/or postcrosslinking, then the glass transition temperatures $Tg1$ and $Tg2$ to be accorded by definition to the monomer compositions 1 and 2 are the glass transition temperatures that may be determined with exclusion of these crosslinking constituents that are present only in minor amounts. Generally speaking, pre- and/or post-crosslinking is advantageous for the initial (directly after filming) and final (after several days) blocking temperatures.

In the manner described above, the monomer compositions 1 and 2 are preferably recruited from the group of the following monomers:
n-butyl acrylate, 2-ethylhexyl acrylate, ethyl acrylate, methyl methacrylate, n-butyl methacrylate, styrene, acrylonitrile, acrylic acid, methacrylic acid, acrylamide, methacrylamide, n-hydroxyethyl acrylate, n-hydroxyethyl methacrylate, n-hydroxypropyl acrylate, n-hydroxypropyl methacrylate, acrylamidopropanesulfonic acid, and also vinylsulfonic acid and its alkali metal salts, N-(2-acryloyloxyethyl)imidazolidin-2-one, N-(2-methacryloyloxyethyl)imidazolidin-2-one (2-ureidomethacrylate, UMA), itaconic acid, and acetoacetoxyethyl methacrylate (AAEM).

With particular preference the monomer compositions 1 and 2, in the manner described above, are recruited from the group of the following monomers:
n-butyl acrylate, 2-ethylhexyl acrylate, methyl methacrylate, n-butyl methacrylate, acrylic acid, methacrylic acid, acrylonitrile, acrylamide, methacrylamide, N-(2-acryloyloxyethyl)imidazolidin-2-one, N-(2-methacryloyloxyethyl)imidazolidin-2-one (2-ureidomethacrylate, UMA), itaconic acid, and acetoacetoxyethyl methacrylate (AAEM).

Overall it proves favorable if on the one hand the monomer composition i with the lower $Tgi$ value, based on the monomer composition i, comprises 10% to 50% by weight of those monomers whose homopolymers have Tg values above the lower $Tgi$, and, on the other hand, the monomer composition i with the higher $Tgi$ value, based in the same way, at the same time comprises 0% to 25% by weight of those monomers whose homopolymers have Tg values below the higher $Tgi$. Generally speaking, advantage attaches to those aqueous polymer dispersions of the invention whose MFFT without addition of film-forming assistant is <30° C., preferably <10° C.

Monomers contemplated as nitrogen-containing adhesion monomers include, in particular, radically polymerizable monomers having at least one amino, ureido or N-heterocyclic group.

A multiplicity of such suitable adhesion monomers is found in EP-B 421 185, in EP-B 379 892 on page 3, in EP-A 609 756 on page 2, in DE-A 43 34 178, in DE-A 39 02 067 on pages 3/4, and in the references cited in these specifications.

Examples include aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethyl-prop-1-yl acrylate and methacrylate, 2-N-morpholinoethyl acrylate and methacrylate, 2-N-piperidinoethyl acrylate and methacrylate, N-(3-dimethylaminopropyl)acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole and also monoethylenically unsaturated derivatives of ethyleneurea such as N-(2-acryloyloxyethyl)ethyleneurea, N-(b-acrylamidoethyl)ethyleneurea, N-2-(allylcarbamato)aminoethylimidazolidinone (WAM IV from Air Products and Chemicals), N-(3-allyloxy-2-hydroxypropyl)aminoethylethyleneurea (Sipomer® WAM from Alcolac), N-vinylethyleneurea, N-vinyloxyethylethyleneurea, N-methacryloyloxyacetoxyethylethyleneurea, N-(acrylamidomethylene)ethyleneurea, N-(methacrylamidomethylene)ethyleneurea, and also the particularly preferred N-(2-methacryloyloxyethyl)ethyleneurea [1-(2-methacryloyloxyethyl)imidazolin-2-one ureidoethyl methacrylate ethyleneurea-ethyl methacrylate (Plex® 6844-0 from Röhm GmbH) and N-(methacrylamidoethyl)ethyleneurea N-(b-methacrylamidoethyl)ethyleneurea (Sipomer WAM II from Rhône-Poulenc). Other particularly suitable ureido monomers are given in a review article by R. W. Kreis, A. M. Sherman, Developments in "Ureido Functional Monomer for Promoting Wet Adhesion in Latex Paints, Water-Borne and Higher Solids Coating Symposium from to May 2-3, 1988, New Orleans, La.".

It is preferred for 30 to 100 mol %, or 40 to 100 mol %, or 50 to 100 mol % of the adhesion monomers comprising the element nitrogen and intended by definition for copolymerization to be copolymerized in polymerization stage 1. In terms of an optimum balance between all of the desired properties, particularly advantageous aqueous polymer dispersions of the invention are obtained when 40 to 60 mol % of the adhesion monomers to be copolymerized overall by definition are copolymerized in polymerization stage 1.

The aqueous polymer dispersions of the invention are preferably prepared with a solids content >40%, advantageously >50%, by weight, based on the overall aqueous polymer dispersion. In a way which is advantageous from the standpoint of application, the solids content will generally be 40% to 70% by weight.

In terms of the desired performance properties it is favorable if the weight-average diameter of the dispersed polymer particles is in the range from 40 to 300 nm. Particularly favorable weight-average polymer particle diameters are 50 to 200 nm and 50 to 150 nm. Where the dynamic viscosity of the aqueous polymer dispersion of the invention does not play a part essential to the decision, the distribution of the polymer particle diameters is preferably narrow. The polydispersity of the polymer particle diameter distribution ought to be below 5, preferably below 2. It is given as the ratio of weight-average to number-average polymer particle diameter.

The aqueous polymer dispersions of the invention are prepared in accordance with the above-indicated "product by process" definition of the subject matter of the invention, in other words by the method of radical aqueous emulsion polymerization in the presence of dispersants and radical polymerization initiators.

The ratio of the water phase to the total amount of the monomers used in both stages is selected in accordance with the desired solids content of the aqueous polymer dispersion to be prepared.

Monomer composition 1 can be introduced, as a monomer mixture corresponding thereto in the form of an aqueous monomer emulsion, in its entirety as an initial charge to the polymerization vessel, or can be metered into this vessel, partly or wholly in the course of the polymerization stage 1, in a water-free form or emulsified in an aqueous medium. Monomer composition 1 can of course also be realized only with integral consideration over the entire polymerization stage 1. In this case, a monomer mixture which alters over time in its composition is added to the polymerization vessel, the composition of this monomer mixture corresponding to monomer composition 1 only when considered integrally. This latter procedure is less preferred. After the end of polymerization stage 1, monomer composition 2 can be added to the polymerization vessel correspondingly, all at once or partly or wholly in the course of polymerization stage 2, being metered in in water-free form or as an emulsion in an aqueous medium. The adhesion monomers to be copolymerized in accordance with the invention are preferably added to the polymerization vessel after having been mixed into the other monomers or emulsions thereof. In both polymerization stages, therefore, monomer mixtures are preferably supplied to the polymerization vessel that are constant over time in their composition over the respective polymerization stage. This supplying is advantageously performed in such a way that at any point in time after the beginning of the polymerization, the polymerization conversion of the monomers already supplied to the polymerization vessel is >90% by weight, preferably >95% by weight, and more preferably >98% by weight.

In both stages the polymerization is started by conventional radical initiators. Initiators contemplated as such are all those capable of starting a radical aqueous emulsion polymerization. They may be peroxides, e.g., alkali metal peroxodisulfate or ammonium peroxodisulfate, or azo compounds such as azobisisobutyronitrile or 4,4'-azobiscyanovaleric acid. It is advantageous to use combined systems as well, composed of at least one organic reducing agent and at least one peroxide and/or hydroperoxide, an example being tert-butyl hydroperoxide and the sodium metal salt of hydroxymethanesulfinic acid, or hydrogen peroxide and ascorbic acid, and, very preferably, combined systems which additionally include a small amount of a metal compound which is soluble in the polymerization medium and whose metallic component is able to occur in a plurality of valence states, an example being ascorbic acid/iron(II) sulfate/hydrogen peroxide, where instead of ascorbic acid frequently the sodium metal salt of hydroxymethanesulfinic acid, sodium sulfite or sodium hydrogensulfite is used, and frequently, instead of hydrogen peroxide, alkali metal peroxodisulfates and/or ammonium peroxodisulfate are employed. Instead of a water-soluble iron (II) salt, use is frequently also made of a V salt or of a combination of water-soluble Fe/V salts. The amount of radical initiator systems used, based on the total amount of the monomers to be polymerized, is preferably 0.1% to 2% by weight. In a manner known per se to the skilled person, depending on their nature, the polymerization initiators may be introduced all at once into the polymerization vessel or may be added thereto continuously at the rate at which they are consumed, in other words in accordance with the progress of the polymerization.

Polymerization pressure and polymerization temperature are of relatively minor importance. Generally speaking, both polymerization stages are operated at temperatures between room temperature and 100° C., preferably 50 to 95° C., and more preferably 60 to 90° C. The application of reduced or elevated pressure is possible, and so the polymerization temperature may also exceed 100° C. and may amount to up to 130° C. or more. Volatile monomers such as ethylene or butadiene are preferably polymerized under increased pressure. To regulate the pH of the polymerization medium, it is preferred to add pH buffers such as NaHCO3, Na2CO3, Na acetate or Na2P2O5 during the radical aqueous emulsion polymerization of the invention. With advantage, the pH buffers are incorporated into the aqueous monomer emulsions for supply. It is preferred to carry out buffering to a pH of 3 to 6. This measure results in increased levels of freedom from coagulant and gel specks (microcoagulant) in the aqueous polymer dispersions of the invention. Alternatively to the use of buffers, the aqueous monomer emulsion for supply may also be supplied in a form in which it has been partly neutralized to a pH of 3 to 6 by means of a strong base (e.g., NaOH). The final, ready-for-use pH of the aqueous polymer dispersions of the invention is generally increased to levels of above 7, preferably up to 9, by addition of bases such as ammonia, alkali metal hydroxide (NaOH, KOH), alkali metal oxide, alkaline earth metal oxide, alkaline earth metal hydroxide (Ca(OH)2), ZnO, metal carbonates, metal hydrogencarbonates or amines such as 2-amino-2-methyl-1-propanol, ethanolamine, diethanolamine, triethylamine, morpholine, N,N-dimethylethanolamine or 2-dimethylamino-2-methyl-1-propanol.

For the purpose of improving the reproducibility and setting defined particle diameters, the phase of polymer particle formation and the phase of polymer particle growth are advantageously decoupled from one another in a manner known per se to the skilled person, by introducing a defined amount of a pre-formed aqueous polymer dispersion (a seed latex) into the polymerization vessel or pre-forming such a seed latex in said vessel in situ. The amount of dispersant added in the further course of the radical aqueous emulsion polymerization in this case is generally such that the critical micelle concentration is no longer exceeded and hence new formation of polymer particles is avoided. Where the aim is for a broad particle diameter distribution for the purpose of producing highly concentrated aqueous polymer dispersions of the invention, seed latex will generally be added to the polymerization vessel additionally in a manner known per se during the radical aqueous emulsion polymerization. In the context of the radical aqueous emulsion polymerization of the invention, of course, it is also possible to use agents which regulate the molecular weight, such as mercaptans, for example. This generally facilitates film formation (lower MFFT) and hence promotes the level of gloss. Frequently, however, the polymerization takes place in the absence thereof. As for processes of radical polymerization generally, the process of the invention can be employed, in a known way to the skilled person, both under an inert gas atmosphere (e.g., N2, Ar) and under an oxygen-containing atmosphere (e.g., air).

Dispersants contemplated, which in particular ensure the stability of the aqueous polymer dispersion of the invention, include not only emulsifiers but also the protective colloids that are typically used for the implementation of radical aqueous emulsion polymerizations.

Suitable protective colloids are, for example, polyvinyl alcohols, cellulose derivatives or copolymers containing vinylpyrrolidone. A comprehensive description of other suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. It is of course also possible to use mixtures of emulsifiers and/or protective colloids. As dispersants it is preferred to use exclusively emulsifiers, whose relative molecular weights, in contradistinction to the protective colloids, are usually below 2000, preferably below 1000. They may be anionic, cationic or nonionic in nature. Where mixtures of surface-active substances are used, the individual components must of course be compatible with one another, something which in case of doubt can be checked by means of a few preliminary experiments. Generally speaking, anionic emulsifiers are compatible with one another and with nonionic emulsifiers. Same is true of cationic emulsifiers, whereas anionic and cationic emulsifiers are usually incompatible with one another. Customary emulsifiers are, for example, ethoxylated mono-, di-, and tri-alkylphenols (EO degree: 3 to 100, alkyl radical: C4 to C12), ethoxylated fatty alcohols (EO degree: 3 to 100, preferably 6 to 50, alkyl radical: C6 to C20), and also alkali metal salts and ammonium salts of alkyl sulfates (alkyl radical: C8 to C18), of sulfuric monoesters of ethoxylated alkanols (EO degree: 1 to 70, more particularly 2 to 10, alkyl radical: C10 to C18) and of ethoxylated alkylphenols (EO degree: 3 to 100, preferably 6 to 50, alkyl radical: C4 to C18), of alkylsulfonic acids (alkyl radical: C10 to C18) and of alkylarylsulfonic acids (alkyl radical: C9 to C18). Further suitable emulsifiers such as sulfosuccinic esters are found in Houben-Weyl, Methoden der organischen Chemie, volume XIV/1, Makromolekulare Stoffe, Georg-Thieme Verlag, Stuttgart, 1961, pages 192 to 208.

Likewise suitable as anionic emulsifiers are bis(phenylsulfonic acid) ethers and their alkali metal salts or ammonium salts which carry a $C_4$-$C_{24}$-alkyl group on one or both aromatic rings. These compounds are general knowledge, as for example from U.S. Pat. No. 4,269,749, and are available commercially, as for example as Dowfax® 2A1 (Dow Chemical Company).

In general the amount of dispersant used is 0.5% to 6%, preferably 1% to 5%, and more preferably 2% to 4%, by weight, based on the monomers for radical polymerization.

An improved resistance toward chemicals is understood for example to be an improved resistance toward hand cream, endogenous fats, household cleaning products, alcohols, and other household chemicals, but more particularly toward hand cream.

A typical field of use for the aqueous polymer dispersions of the invention is the sector of aqueous, more particularly organic-solvent-free coating and covering compositions, where the film formed from the aqueous polymer dispersion bonds adheringly to the substrate.

Classed within this sector are, more particularly, paints for interior and exterior applications in architecture.

Also to be stated are industrial coating materials, especially insofar as elevated temperatures are unrealizable or difficult to realize in the course of the application of said materials. Examples of such coatings are finishes, adhesion primers, and insulating systems. The aqueous polymer dispersions of the invention are further suitable for consolidating sheetlike fiber structures. Whereas for the latter applications, films of the pure polymeric dispersions are suitable, for the paints and coatings sectors they are generally pigmented and/or admixed with fillers. Here, commonplace formulas and formulations can be employed, all enjoying the advantages of low MFFT, increased gloss, and increased elongation at break. To be stated here are, in particular, stains, colored varnishes, satin-gloss, gloss, and high-gloss paints, and also compositions for the coating of leather. Especially suitable substrates include wood, leather, metal, plastic, and mineral materials. The polymers of the invention are also suitable as an additive in mineral binders, more particularly those based on cement.

For applications in the interior sector in particular it is necessary for the aqueous polymer dispersions of the invention to be largely free from residual monomers and from organic solvent. This can be achieved in a conventional way by means for example of distillative removal (more particularly by steam distillation) or by stripping with an inert gas. It is of course also possible to employ methods of radical afterpolymerization (more particularly with exposure to redox initiator systems) of the kind set out for example in DE-A 44 35 423, DE-A 44 19 518, and DE-A 44 35 422, or as cited as prior art.

The polymers dispersed in the aqueous polymer dispersions of the invention can be isolated by means for example of careful spray drying, or by conventional coagulation with subsequent extractive washing. Where they are not inherently directly redipsersible in an aqueous medium, they generally dissolve in organic solvents. These solutions can be transferred to an aqueous medium and converted, by distillative removal of the organic solvent and addition of dispersant, into a state of stable, disperse distribution of the polymer in the aqueous medium.

The aqueous polymer dispersions obtainable by the process of the invention contain polymer particles which have a weight-average particle diameter of $D_w$ in the range $\geq 10$ and $\leq 500$ nm, preferably $\geq 20$ and $\leq 200$ nm, and with more particular preference $\geq 20$ nm to $\leq 150$ nm. The determination of the weight-average particle diameter is known to the skilled person and is accomplished for example via the method of dynamic light scattering. The particle size for the purposes of this specification is the weight-average diameter of the polymer particles in the dispersion as determined by the method of dynamic light scattering (determined in accordance with ISO13321 using a High Performance Particle Sizer from Malvern at 22° C. with a wavelength of 633 nm).

The aqueous polymer dispersions obtainable by the process of the invention and having weight-average particle diameters $D_w \leq 150$ nm exhibit surprisingly good blocking resistance and are therefore especially suitable as binders for the coating of substrates.

In this context they frequently display advantages such as reduced demand for thickeners for setting a defined viscosity, and also good and deep coloration when color pigments are used.

The aqueous polymer dispersion typically has a solids content of 20% to 70% by weight, preferably 35% to 60% by weight.

The aqueous polymer dispersion obtained can be used as it is or mixed with further—generally film-forming—polymers as a binder composition in aqueous coating materials, such as paint or varnish mixtures.

The aqueous polymer dispersions of the invention that are obtainable by the process of the invention can of course also be used as a component in the production of adhesives, sealants, polymeric renders, paper-coating slips, fiber nonwovens, and coating materials for organic substrates, and also for the modification of mineral binders.

The invention further provides a coating material in the form of an aqueous composition comprising at least one polymer dispersion of the invention, as defined above,
optionally at least one (in)organic filler and/or at least one (in)organic pigment,
optionally at least one customary auxiliary, and
water.

The binder compositions of the invention are preferably employed in aqueous paints. These paints take the form, for example, of an unpigmented system (clear varnish) or of a pigmented system. The proportion of the pigments can be described by the pigment volume concentration (PVC). The PVC describes the ratio of the volume of pigments ($V_P$) and fillers ($V_F$) to the total volume, composed of the volumes of binder (VB), pigments, and fillers in a dry coating film, in percent: $PVC=(V_P+V_F)\times 100/(V_P+V_F+VB)$. Coating materials can be classified as follows on the basis of the PVC, for example:

| | |
|---|---|
| highly filled interior paint, wash resistant, white/matt | PVC = about 85 |
| interior paint, scrub resistant, white/matt | PVC = about 80 |
| masonry paint, white | PVC = about 45-55 |
| semigloss paint, silk-matt | PVC = about 35 |
| semigloss paint, silk-gloss | PVC = about 25 |
| high-gloss paint | PVC = about 15-25 |
| clear varnish | PVC = <5 |

These dispersions are used preferably in formulations having a PVC<50, more preferably PVC<40.

Suitable fillers in clear varnish systems are, for example, matting agents, which accordingly, as desired, significantly negatively affect the gloss. Matting agents are generally transparent and may be both organic and inorganic. Inorganic fillers based on silica are most suitable and are widely available commercially. Examples are the Syloid® products from W.R. Grace & Company, and the Acematt® products from Evonik GmbH. Organic matting agents are available, for example, from BYK-Chemie GmbH under the Ceraflour® and Ceramat® brand names, and from Deuteron GmbH under the Deuteron MK® brand name. Other suitable fillers for emulsion paints are aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In paints, of course, finely divided fillers are preferred. The fillers can be used as individual components. In practice, however, it has been found particularly appropriate to have filler mixtures, examples being calcium carbonate/kaolin and calcium carbonate/talc. Glossy paints generally contain only small amounts of very fine fillers, or contain no fillers at all.

Finely divided fillers may also be used in order to increase the hiding power and/or to save on the use of white pigments. For adjustment of the hiding power, of the hue, and of the depth of color it is preferred to use blends of color pigments and fillers.

Examples of suitable pigments are inorganic white pigments such as titanium dioxide, preferably in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. Besides the inorganic pigments, the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal-complex pigments. Also suitable are synthetic white pigments with air inclusions to increase light scattering, such as the Ropaque® and AQACell® dispersions. Additionally suitable are the Luconyl® products from BASF SE, such as Lyconyl® yellow, Luconyl® brown, and Luconyl® red, for example, especially the transparent varieties.

The coating material of the invention (aqueous paint) may optionally comprise additional film-forming polymers, pigment, and further auxiliaries, as well as the polymer dispersion.

The customary auxiliaries include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and also salts of naphthalenesulfonic acids, especially their sodium salts. More important are the film-forming assistants, the thickeners, and defoamers. Suitable film-forming assistants are, for example, Texanol® from Eastman Chemicals, and the glycol ethers and esters, available commercially from BASF SE, for example, under the names Solvenon® and Lusolvan®, and from Dow under the trade name Dowanol®. The amount is preferably <10% by weight and more preferably <5% by weight, based on the total formulation. It is also possible to formulate entirely without solvents.

Other suitable auxiliaries are flow control agents, defoamers, biocides, and thickeners. Suitable thickeners are, for example, associative thickeners, such as polyurethane thickeners. The amount of the thickener is preferably less than 2.5% by weight, more preferably less than 1.5% by weight thickener, based on paint solids content. Further formulating information for wood paints is described at length in 'water-based acrylates for decorative coatings' by the authors M. Schwartz and R. Baumstark, ISBN 3-87870-726-6.

The paints of the invention are produced in a known way by blending the components in mixing equipment customary for this purpose. It has been found appropriate to prepare an aqueous paste or dispersion from the pigments, water, and optionally the auxiliaries, and only then to mix the polymeric binder, i.e., in general, the aqueous dispersion of the polymer, with the pigment paste or pigment dispersion.

The paint of the invention can be applied to substrates in a customary way, as for example by spreading, spraying, dipping, rolling or knife coating.

The paints of the invention are notable for ease of handling and good processing properties. Their pollutant content is low. They have good performance properties, examples being high water resistance, effective wet adhesion, and good blocking resistance, good recoatability, and good flow on application. The equipment used is easily cleaned with water.

The invention will be illustrated by the nonlimiting examples which follow.

EXAMPLES a) Preparation of the Aqueous Polymer Dispersions

The solids content (SC) was determined generally by drying a defined amount of the aqueous polymer dispersion (approximately 1 g) to constant weight on an aluminum crucible having an internal diameter of approximately 5 cm in a drying cabinet at 140° C. Two separate measurements were carried out. The values reported in the examples represent the average of the two results in each case. The minimum film-forming temperature (MFFT) was determined in accordance with Ullmanns Enzyklopädie der technischen Chemie, 4th edn., vol. 19, Verlag Chemie, Weinheim (1980), p. 17. The instrument used was a film-forming bench (a metal plate to which a temperature gradient is applied). Filming took place at a wet film thickness of 1 mm. The minimum film-forming temperature reported is the temperature at which the film begins to develop cracks.

The glass transition temperatures can be determined by Dynamic Scanning calorimetry (DSC, to ASTM D 3418-08; the temperatures recorded are so-called midpoint temperatures).

Comparative Example 1

A polymerization vessel equipped with metering devices and temperature regulation was charged at 20 to 25° C. (room temperature) under a nitrogen atmosphere with

| | |
|---|---|
| 200.8 g | of deionized water and |
| 35.0 g | of a 15% strength by weight aqueous solution of sodium lauryl sulfate, | and this initial charge was heated to 87° C. with stirring. When this temperature had been reached, 29.8 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 120 minutes, and, in parallel with this, the remainder of feed 3 was metered in continuously over the course of 165 minutes, at constant flow rates. After the end of feed 1, feed 2 was commenced and was metered in continuously over the course of 45 minutes at a constant flow rate.

Feed 1 (homogeneous mixture of):

| | |
|---|---|
| 329.1 g | of deionized water |
| 23.3 g | of a 15% strength by weight aqueous solution of sodium lauryl sulfate |
| 5.7 g | of a 50% strength by weight aqueous solution of acrylamide |
| 5.1 g | of acrylic acid |
| 27.0 g | of a 25% strength by weight solution of ureido methacrylate in methyl methacrylate[a] |
| 199.2 g | of methyl methacrylate and |
| 285.5 g | of 2-ethylhexyl acrylate |

Feed 2 (homogeneous mixture of):

| | |
|---|---|
| 174.4 g | of deionized water |
| 8.9 g | of a 15% strength by weight aqueous solution of sodium lauryl sulfate |
| 5.1 g | of acrylic acid |
| 27.0 g | of a 25% strength by weight solution of ureido methacrylate in methyl methacrylate[a] and |
| 148.2 g | of methyl methacrylate |

Feed 3 (homogeneous solution of):

| | |
|---|---|
| 13.0 g | of deionized water and |
| 1.0 g | of sodium peroxodisulfate |

After the end of feeds 2 and 3, the polymerization mixture was reacted for 30 minutes more at 87° C. Following this, beginning simultaneously but via separate feed lines, 22.4 g of a 5% strength by weight aqueous hydrogen peroxide solution, and a solution of 1.0 g of ascorbic acid and 26.5 g of deionized water, were metered in to the polymerization mixture continuously over the course of 60 minutes at constant flow rates.

The aqueous polymer dispersion obtained was subsequently cooled to room temperature, neutralized with 5.9 g of a 25% strength by weight aqueous ammonia solution, and filtered through a 125 µm filter.

The resulting 1544 g of the aqueous polymer dispersion had a solids content of 45.2% by weight. The MFFT was 13° C. Diluted with deionized water, the aqueous polymer dispersion had a particle diameter of 95 nm, determined by means of dynamic light scattering. The glass transition temperature of the first stage, measured using DSC, was 5° C., and that of the second stage 105° C.

[a)]Plex® 6844-0 from Röhm GmbH.

Example 1

A polymerization vessel equipped with metering devices and temperature regulation was charged at 20 to 25° C. (room temperature) under a nitrogen atmosphere with

| | |
|---|---|
| 201.4 g | of deionized water and |
| 35.1 g | of a 15% strength by weight aqueous solution of sodium lauryl sulfate, | and this initial charge was heated to 87° C. with stirring. When this temperature had been reached, 32.4 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 130 minutes, and, in parallel with this, the remainder of feed 3 was metered in continuously over the course of 165 minutes, at constant flow rates. After the end of feed 1, feed 2 was commenced and was metered in continuously over the course of 35 minutes at a constant flow rate.

Feed 1 (homogeneous mixture of):

| | |
|---|---|
| 363.2 g | of deionized water |
| 25.2 g | of a 15% strength by weight aqueous solution of sodium lauryl sulfate |
| 6.2 g | of a 50% strength by weight aqueous solution of acrylamide |
| 5.6 g | of acrylic acid |
| 29.2 g | of a 25% strength by weight solution of ureido methacrylate in methyl methacrylate[a)] |
| 301.9 g | of methyl methacrylate and |
| 221.9 g | of 2-ethylhexyl acrylate |

Feed 2 (homogeneous mixture of):

| | |
|---|---|
| 117.9 g | of deionized water |
| 7.0 g | of a 15% strength by weight aqueous solution of sodium lauryl sulfate |
| 4.0 g | of acrylic acid |
| 21.1 g | of a 25% strength by weight solution of ureido methacrylate in methyl methacrylate[a)] and |
| 115.3 g | of methyl methacrylate |

Feed 3 (homogeneous solution of):
14.0 g of a 7% strength aqueous solution of sodium peroxodisulfate After the end of feeds 2 and 3, the polymerization mixture was reacted for 30 minutes more at 87° C. Then 3.1 g of a 25% strength aqueous ammonia solution were present. Following this, beginning simultaneously but via separate feed lines, 23.0 g of a 5% strength by weight aqueous hydrogen peroxide solution, and 9.8 g of a 10% strength aqueous solution of ascorbic acid, were metered in to the polymerization mixture continuously over the course of 60 minutes at constant flow rates.

The aqueous polymer dispersion obtained was subsequently cooled to room temperature, neutralized with 2.8 g of a 25% strength by weight aqueous ammonia solution, and filtered through a 125 µm filter.

The aqueous polymer dispersion obtained had a solids content of 44.7% by weight. The particle diameter as determined by dynamic light scattering was found to be 60 nm. According to dynamic scanning calorimetry, the glass transition temperatures were 27° C. and 107° C.

Example 2

A polymerization vessel equipped with metering devices and temperature regulation was charged at 20 to 25° C. (room temperature) under a nitrogen atmosphere with

| | |
|---|---|
| 201.4 g | of deionized water and |
| 35.1 g | of a 15% strength by weight aqueous solution of sodium lauryl sulfate, | and this initial charge was heated to 87° C. with stirring. When this temperature had been reached, 32.4 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 130 minutes, and, in parallel with this, the remainder of feed 3 was metered in continuously over the course of 165 minutes, at constant flow rates. After the end of feed 1, feed 2 was commenced and was metered in continuously over the course of 35 minutes at a constant flow rate.

Feed 1 (homogeneous mixture of):

| | |
|---|---|
| 288.3 g | of deionized water |
| 25.2 g | of a 15% strength by weight aqueous solution of sodium lauryl sulfate |
| 6.2 g | of a 50% strength by weight aqueous solution of acrylamide |
| 79.2 g | of a 7% strength by weight aqueous solution of itaconic acid |
| 29.2 g | of a 25% strength by weight solution of ureido methacrylate in methyl methacrylate[a)] |
| 301.9 g | of methyl methacrylate and |
| 221.9 g | of 2-ethylhexyl acrylate |

Feed 2 (homogeneous mixture of):

| | |
|---|---|
| 117.9 g | of deionized water |
| 7.0 g | of a 15% strength by weight aqueous solution of sodium lauryl sulfate |
| 4.0 g | of acrylic acid |
| 21.1 g | of a 25% strength by weight solution of ureido methacrylate in methyl methacrylate[a)] and |
| 115.3 g | of methyl methacrylate |

Feed 3 (homogeneous solution of):
14.0 g of a 7% strength aqueous solution of sodium peroxodisulfate After the end of feeds 2 and 3, the polymerization mixture was reacted for 30 minutes more at 87° C. Then 3.1 g of a 25% strength aqueous ammonia solution were present. Following this, beginning simultaneously but via separate feed lines, 23.0 g of a 5% strength by weight aqueous hydrogen peroxide solution, and 9.8 g of a 10% strength by weight aqueous solution of ascorbic acid, were metered in to the polymerization mixture continuously over the course of 60 minutes at constant flow rates.

The aqueous polymer dispersion obtained was subsequently cooled to room temperature, neutralized with 5.6 g of a 25% strength by weight aqueous ammonia solution, and filtered through a 125 μm filter.

The aqueous polymer dispersion obtained had a solids content of 44.7% by weight. The particle diameter as determined by dynamic light scattering was found to be 87 nm. According to dynamic scanning calorimetry, the glass transition temperatures were 25° C. and 105° C.

Example 3

A polymerization vessel equipped with metering devices and temperature regulation was charged at 20 to 25° C. (room temperature) under a nitrogen atmosphere with
203.6 g of deionized water and
35.5 g of a 15% strength by weight aqueous solution of sodium lauryl sulfate,
and this initial charge was heated to 80° C. with stirring. When this temperature had been reached, 23.5 g of feed 1 and subsequently, with the temperature maintained, 8.8 g of feed 3 were added, and polymerization took place for 5 minutes. Thereafter, beginning simultaneously, the remainder of feed 1 was metered in continuously over the course of 150 minutes, and, in parallel with this, the remainder of feed 3 was metered in continuously over the course of 195 minutes, at constant flow rates. After the end of feed 1, feed 2 was commenced and was metered in continuously over the course of 45 minutes at a constant flow rate.

Feed 1 (homogeneous mixture of):

| | |
|---|---|
| 278.8 g | of deionized water |
| 23.7 g | of a 15% strength by weight aqueous solution of sodium lauryl sulfate |
| 5.8 g | of a 50% strength by weight aqueous solution of acrylamide |
| 5.2 g | of acrylic acid |
| 27.4 g | of a 25% strength by weight solution of ureido methacrylate in methyl methacrylate[a] |
| 60.0 g | of methyl methacrylate and |
| 289.4 g | of 2-ethylhexyl acrylate |
| 141.9 g | of acrylonitrile after 20 minutes in feed 1 |

Feed 2 (homogeneous mixture of):

| | |
|---|---|
| 99.0 g | of deionized water |
| 9.0 g | of a 15% strength by weight aqueous solution of sodium lauryl sulfate |
| 5.2 g | of acrylic acid |
| 27.4 g | of a 25% strength by weight solution of ureido methacrylate in methyl methacrylate[a] and |
| 150.2 g | of methyl methacrylate |

Feed 3 (homogeneous solution of):
60.8 g of a 7% strength aqueous solution of sodium peroxodisulfate
After the end of feeds 2 and 3, the polymerization mixture was reacted for 30 minutes more at 80° C. Then 3.1 g of a 25% strength aqueous ammonia solution were present. Following this, beginning simultaneously but via separate feed lines, 56.8 g of a 5% strength by weight aqueous hydrogen peroxide solution, and 51.1 g of a 10% strength aqueous solution of ascorbic acid, were metered in to the polymerization mixture continuously over the course of 60 minutes at constant flow rates.

The aqueous polymer dispersion obtained was subsequently cooled to room temperature, neutralized with 6.8 g of a 25% strength by weight aqueous ammonia solution, and filtered through a 125 μm filter.

The aqueous polymer dispersion obtained had a solids content of 44.3% by weight. The particle diameter as determined by dynamic light scattering was found to be 129 nm. The glass transition temperature of the first stage, measured by DSC, was 27° C., and that of the second stage 107° C.

Comparative Example 2

A polymerization vessel equipped with metering devices and temperature regulation was charged at 20 to 25° C. (room temperature) under a nitrogen atmosphere with

| | |
|---|---|
| 201.4 g | of deionized water and |
| 35.1 g | of a 15% strength by weight aqueous solution of sodium lauryl sulfate, | and this initial charge was heated to 87° C. with stirring. When this temperature had been reached, 32.5 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 130 minutes, and, in parallel with this, the remainder of feed 3 was metered in continuously over the course of 165 minutes, at constant flow rates. After the end of feed 1, feed 2 was commenced and was metered in continuously over the course of 35 minutes at a constant flow rate.

Feed 1 (homogeneous mixture of):

| | |
|---|---|
| 290.5 g | of deionized water |
| 25.2 g | of a 15% strength by weight aqueous solution of sodium lauryl sulfate |
| 6.2 g | of a 50% strength by weight aqueous solution of acrylamide |
| 79.2 g | of a 7% strength by weight solution of itaconic acid |
| 29.2 g | of a 25% strength by weight solution of ureido methacrylate in methyl methacrylate[a] and |
| 301.9 g | of methyl methacrylate and |
| 221.9 g | of 2-ethylhexyl acrylate |
| 1.4 g | of tert-dodecyl mercaptan |

Feed 2 (homogeneous mixture of):

| | |
|---|---|
| 117.9 g | of deionized water |
| 7.0 g | of a 15% strength by weight aqueous solution of sodium lauryl sulfate |
| 4.0 g | of acrylic acid |
| 21.1 g | of a 25% strength by weight solution of ureido methacrylate in methyl methacrylate[a] and |
| 115.3 g | of methyl methacrylate |

Feed 3 (homogeneous solution of):
14.0 g of a 7% strength aqueous solution of sodium peroxodisulfate
After the end of feeds 2 and 3, the polymerization mixture was reacted for 30 minutes more at 87° C. Then 3.1 g of a 25% strength aqueous ammonia solution were present. Following this, beginning simultaneously but via separate feed lines, 22.5 g of a 5% strength by weight aqueous hydrogen peroxide solution, and 9.8 g of a 10% strength aqueous solution of ascorbic acid, were metered in to the polymerization mixture continuously over the course of 60 minutes at constant flow rates.

The aqueous polymer dispersion obtained was subsequently cooled to room temperature, neutralized with 5.6 g of a 25% strength by weight aqueous ammonia solution, and filtered through a 125 µm filter.

The aqueous polymer dispersion obtained had a solids content of 44.4% by weight. The particle diameter as determined by dynamic light scattering was found to be 86 nm. The glass transition temperature of the first stage, measured by DSC, was 21° C., and that of the second stage 105° C.

Example 4

A polymerization vessel equipped with metering devices and temperature regulation was charged at 20 to 25° C. (room temperature) under a nitrogen atmosphere with

| | |
|---|---|
| 201.4 g | of deionized water and |
| 35.1 g | of a 15% strength by weight aqueous solution of sodium lauryl sulfate, | and this initial charge was heated to 87° C. with stirring. When this temperature had been reached, 32.4 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 130 minutes, and, in parallel with this, the remainder of feed 3 was metered in continuously over the course of 165 minutes, at constant flow rates. After the end of feed 1, feed 2 was commenced and was metered in continuously over the course of 35 minutes at a constant flow rate.

Feed 1 (homogeneous mixture of):

| | |
|---|---|
| 288.3 g | of deionized water |
| 25.2 g | of a 15% strength by weight aqueous solution of sodium lauryl sulfate |
| 6.2 g | of a 50% strength by weight aqueous solution of acrylamide |
| 79.2 g | of a 7% strength by weight solution of itaconic acid |
| 320.2 g | of methyl methacrylate and |
| 211.7 g | of 2-ethylhexyl acrylate |
| 21.1 g | of acetoacetoxyethyl methacrylate |

Feed 2 (homogeneous mixture of):

| | |
|---|---|
| 117.9 g | of deionized water |
| 7.0 g | of a 15% strength by weight aqueous solution of sodium lauryl sulfate |
| 4.0 g | of acrylic acid |
| 136.4 g | of methyl methacrylate |

Feed 3 (homogeneous solution of):
14.0 g of a 7% strength aqueous solution of sodium peroxodisulfate After the end of feeds 2 and 3, the polymerization mixture was reacted for 30 minutes more at 87° C. Then 3.1 g of a 25% strength aqueous ammonia solution were present. Following this, beginning simultaneously but via separate feed lines, 23.0 g of a 5% strength by weight aqueous hydrogen peroxide solution, and 9.8 g of a 10% strength aqueous solution of ascorbic acid, were metered in to the polymerization mixture continuously over the course of 60 minutes at constant flow rates.

The aqueous polymer dispersion obtained was subsequently cooled to room temperature, neutralized with 5.6 g of a 25% strength by weight aqueous ammonia solution, and filtered through a 125 µm filter.

The aqueous polymer dispersion obtained had a solids content of 44.2% by weight. The particle diameter as determined by dynamic light scattering was found to be 86 nm. According to dynamic scanning calorimetry, the first glass transition temperature was 30° C., and the second 105° C.

Example 5

A polymerization vessel equipped with metering devices and temperature regulation was charged at 20 to 25° C. (room temperature) under a nitrogen atmosphere with

| | |
|---|---|
| 201.4 g | of deionized water and |
| 35.1 g | of a 15% strength by weight aqueous solution of sodium lauryl sulfate, | and this initial charge was heated to 87° C. with stirring. When this temperature had been reached, 32.4 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 130 minutes, and, in parallel with this, the remainder of feed 3 was metered in continuously over the course of 165 minutes, at constant flow rates. After the end of feed 1, feed 2 was commenced and was metered in continuously over the course of 35 minutes at a constant flow rate.

Feed 1 (homogeneous mixture of):

| | |
|---|---|
| 288.3 g | of deionized water |
| 25.2 g | of a 15% strength by weight aqueous solution of sodium lauryl sulfate |
| 6.2 g | of a 50% strength by weight aqueous solution of acrylamide |
| 79.2 g | of a 7% strength by weight solution of itaconic acid |
| 382.6 g | of methyl methacrylate and |
| 249.3 g | of n-butyl acrylate |
| 21.1 g | of acetoacetoxyethyl methacrylate |

Feed 2 (homogeneous mixture of):

| | |
|---|---|
| 117.9 g | of deionized water |
| 7.0 g | of a 15% strength by weight aqueous solution of sodium lauryl sulfate |
| 4.0 g | of acrylic acid |
| 136.4 g | of methyl methacrylate |

Feed 3 (homogeneous solution of):
14.0 g of a 7% strength aqueous solution of sodium peroxodisulfate After the end of feeds 2 and 3, the polymerization mixture was reacted for 30 minutes more at 87° C. Then 3.1 g of a 25% strength aqueous ammonia solution were present. Following this, beginning simultaneously but via separate feed lines, 23.0 g of a 5% strength by weight aqueous hydrogen peroxide solution, and 9.8 g of a 10% strength aqueous solution of ascorbic acid, were metered in to the polymerization mixture continuously over the course of 60 minutes at constant flow rates.

The aqueous polymer dispersion obtained was subsequently cooled to room temperature, neutralized with 5.6 g of a 25% strength by weight aqueous ammonia solution, and filtered through a 125 μm filter.

The aqueous polymer dispersion obtained had a solids content of 44% by weight. According to dynamic scanning calorimetry, the first glass transition temperature was 29° C., and the second 104° C. The particle diameter as determined by dynamic light scattering was found to be 85 nm.

Comparative Example 3

A polymerization vessel equipped with metering devices and temperature regulation was charged at 20 to 25° C. (room temperature) under a nitrogen atmosphere with

| | |
|---|---|
| 201.4 g | of deionized water and |
| 35.1 g | of a 15% strength by weight aqueous solution of sodium lauryl sulfate, | and this initial charge was heated to 87° C. with stirring. When this temperature had been reached, 32.4 g of feed 1 and subsequently, with the temperature maintained, 2.0 g of feed 3 were added, and polymerization took place for 5 minutes. Thereafter, beginning simultaneously, the remainder of feed 1 was metered in continuously over the course of 130 minutes, and, in parallel with this, the remainder of feed 3 was metered in continuously over the course of 165 minutes, at constant flow rates. After the end of feed 1, feed 2 was commenced and was metered in continuously over the course of 35 minutes at a constant flow rate.

Feed 1 (homogeneous mixture of):

| | |
|---|---|
| 288.3 g | of deionized water |
| 25.2 g | of a 15% strength by weight aqueous solution of sodium lauryl sulfate |
| 6.2 g | of a 50% strength by weight aqueous solution of acrylamide |
| 79.2 g | of a 7% strength by weight solution of itaconic acid |
| 264.0 g | of methyl methacrylate and |
| 267.9 g | of 2-ethylhexyl acrylate |
| 21.1 g | of acetoacetoxyethyl methacrylate |

Feed 2 (homogeneous mixture of):

| | |
|---|---|
| 117.9 g | of deionized water |
| 7.0 g | of a 15% strength by weight aqueous solution of sodium lauryl sulfate |
| 4.0 g | of acrylic acid |
| 136.4 g | of methyl methacrylate |

Feed 3 (homogeneous solution of):
14.0 g of a 7% strength aqueous solution of sodium peroxodisulfate After the end of feeds 2 and 3, the polymerization mixture was reacted for 30 minutes more at 87° C. Then 3.1 g of a 25% strength aqueous ammonia solution were present. Following this, beginning simultaneously but via separate feed lines, 23.0 g of a 5% strength by weight aqueous hydrogen peroxide solution, and 9.8 g of a 10% strength aqueous solution of ascorbic acid, were metered in to the polymerization mixture continuously over the course of 60 minutes at constant flow rates.

The aqueous polymer dispersion obtained was subsequently cooled to room temperature, neutralized with 5.6 g of a 25% strength by weight aqueous ammonia solution, and filtered through a 125 μm filter.

The aqueous polymer dispersion obtained had a solids content of 44.3% by weight. The particle diameter as determined by dynamic light scattering was found to be 91 nm. According to dynamic scanning calorimetry, the first glass transition temperature was 0° C., and the second 106° C.

b) Performance Investigations

Hand Cream Test Method:

The paint film was dried at room temperature for 1 week. Then a mixture (1:1 linseed oil/linseed oil fatty acid) was applied to a representative area of the paint. After 1 hour, excess liquid was dabbed off and the pendulum hardnesses of the exposed and unexposed areas of the film were measured in comparison. After a week, the pendulum hardness was determined again. The drop in pendulum hardness is a measure of the hand cream sensitivity.

Pendulum Hardness

The coating to be tested was knife-coated onto a 38×7 cm glass plate using an Erichsen film-drawing apparatus (300 μm wet). After 3 days of drying at room temperature, three measurements were determined by pendulum on three locations on the glass plate. Measurement took place by the method of König (DIN EN ISO 1522).

Soiling Characteristics

Dry activated carbon was scattered over the dried coating to cover it. Excess activated carbon was removed by tapping on the edge, or using compressed air. The soiled test specimens were subsequently immersed in water, rinsed off with 1 l of running water in each case, and finally wiped off three times without pressure using a wet sponge. After drying, the soiling was assessed visually and evaluated with a school grade (0=white, 5=black).

The performance investigations were carried out on a coating based on the formulation specified in table 1.

TABLE 1

| Formulation | | |
|---|---|---|
| Water | | 80 |
| Pigmentverteiler ® MD 20 | Dispersant from BASF SE | 10 |
| Propylene glycol | Solvent from BASF SE | 10 |
| Agitan ® 255 | Defoamer from Münzing Chemie GmbH | 1.7 |
| Collacral ® LR 8990 | Thickener from BASF SE | 24 |
| Kronos ® 2190 | White pigment from Kronos | 190 |
| Omyacarb ® Extra GU | Filler from Omya | 90 |
| Disperse for 20 min, then add: | | |
| Solvenon ® DPM | Solvent from BASF SE | 20 |
| Texanol ® | Solvent from Eastman | 10 |
| Agitan ® 255 | Defoamer from Münzing Chemie GmbH | 0.3 |
| Dispersion, 45% by weight | | 490 |
| Aquaflow ® NHS 300 | Associative thickener from Ashland Inc. | 10 |
| Water | | 64 |
| Total | | 1000 |

The components were added in succession and mixed homogeneously after each step.

TABLE 2

| a) | Pendulum hardness (s) | | | Soiling (school grade) | |
|---|---|---|---|---|---|
|  | 1 [b] | 2 [b] | Loss (%) | 1 [b] | 2 [b] |
| CE 1 | 74 | 6 | 82 | 1 | 5 |
| E 1 | 105 | 28 | 73 | 0-1 | 3 |
| E 2 | 102 | 41 | 60 | 0-1 | 2-3 |
| E 3 | 99 | 70 | 30 | 0-1 | 1 |
| CE 2 | 101 | 13 | 87 | 0-1 | 4 |
| E 4 | 109 | 69 | 37 | 0-1 | 1-2 |
| E 5 | 90 | 70 | 22 | 0-1 | 2-3 |
| CE 3 | 84 | 8 | 90 | 1 | 4-5 | a) CE = comparative example, E = example
b) 1 = untreated with linseed oil mixture, 2 = after treatment

The invention claimed is:

1. A method for preparing a coating composition, the method comprising,
    polymerizing a monomer composition 1 comprising a first monomer comprising an ethylenically unsaturated group, an adhesion monomer that is different from the first monomer and that comprises an ethylenically unsaturated group and nitrogen, and a further monomer that is different from the first monomer and that is selected from the group consisting of itaconic acid, acetoacetoxyethyl (meth)acrylate (AAEM), acrylonitrile, and a combination thereof by radical aqueous emulsion polymerization to a conversion of at least 90, based on the monomer composition 1 to be polymerized to yield a polymer 1, and
    subsequently, in the presence of the polymer 1, polymerizing a monomer composition 2 comprising a second monomer comprising an ethylenically unsaturated group, optionally an adhesion monomer that is different from the second monomer and that comprises an ethylenically unsaturated group and nitrogen, and a further monomer that is different from the second monomer and that is selected from the group consisting of itaconic acid, acetoacetoxyethyl (meth)acrylate (AAEM), acrylonitrile, and a combination thereof by radical aqueous emulsion polymerization, to obtain an aqueous polymer dispersion wherein
    the monomer composition 1 is such that random copolymerization of the composition 1 alone would give a polymer 1 with a glass transition temperature $Tg1>0°$ C.;
    the monomer composition 2 is such that random copolymerization of the composition 2 alone would give a polymer 2 with a glass transition temperature $Tg2>80°$ C.;
    the difference between Tg1 and Tg2 is at least 50° C.;
    the adhesion monomer is copolymerized in an amount of from 0.1% to 10% by weight, based on the total amount of monomers polymerized;
    of the total amount of the adhesion monomers to be copolymerized, from 20 to 100 mol % are copolymerized in the polymerizing of monomer composition 1;
    the polymer of composition 1 or the polymer of composition 2 having a lower glass transition temperature is present in an amount of from 60% to 90% by weight; and
    the further monomer which is different from these monomers and is selected from the group consisting of itaconic acid, acetoacetoxyethyl (meth)acrylate (AAEM), and acrylonitrile is copolymerized in an amount of from 0.2% to 25% by weight, based on the total amount of the monomers to be polymerized.

2. The method of claim 1,
    wherein the conversion is at least 98% by weight, based on the monomer composition 1 to be polymerized.

3. The method of claim 1,
    wherein the polymer 1 has a glass transition temperature of $Tg1>20°$ C.

4. The method of claim 1,
    wherein the polymer 2 has a glass transition temperature of $Tg2>100°$ C.

5. The method of claim 1,
    wherein the adhesion monomer is copolymerized in an amount of from 1% to 3% by weight, based on the total amount of the monomers to be polymerized.

6. The method of claim 1,
    wherein composition 1 or composition 2 having a lower glass transition temperature is present in an amount of from 70% to 85% by weight.

7. The method of claim 1,
    wherein the further monomer selected from the group consisting of itaconic acid, acetoacetoxyethyl (meth)acrylate (AAEM), and acrylonitrile is present in an amount of 0.2% to 25% by weight, based on the total amount of the monomers to be polymerized in the polymerization of monomer composition 1.

8. The method of claim 1,
    wherein the difference between Tg1 and Tg2 is from 40 to 80° C.

9. The method of claim 1,
    wherein the polymer 1 has a lower glass transition temperature compared to polymer 2.

10. The method of claim 1,
    wherein the first monomer, the second monomer, or both is selected from the group of the monomers consisting of n-butyl acrylate, 2-ethylhexyl acrylate, ethyl acrylate, methyl methacrylate, n-butyl methacrylate, styrene, acrylonitrile, acrylic acid, methacrylic acid, acrylamide, methacrylamide, n-hydroxyethyl acrylate, n-hydroxyethyl methacrylate, n-hydroxypropyl acrylate, n-hydroxypropyl methacrylate, acrylamidopropanesulfonic acid, vinylsulfonic acid, and an vinylsulfonic alkali metal salt thereof, N-(2-acryloyloxyethyl)imidazolidin-2-one, N-(2-methacryloyloxyethyl)imidazolidin-2-one (2-ureidomethacrylate, UMA), itaconic acid, acetoacetoxyethyl methacrylate (AAEM), and a combination thereof.

11. The method of claim 1,
    wherein the first monomer, the second monomer, or both is selected from the group consisting of n-butyl acrylate, 2-ethylhexyl acrylate, methyl methacrylate, n-butyl methacrylate, acrylic acid, methacrylic acid, acrylonitrile, acrylamide, methacrylamide, N-(2-acryloyloxyethyl)imidazolidin-2-one, N-(2-methacryloyloxyethyl)imidazolidin-2-one (2-ureidomethacrylate, UMA), itaconic acid, and acetoacetoxyethyl methacrylate (AAEM).

12. The method of claim 1,
    wherein the polymer of composition 1 or the polymer of composition 2 having a lower glass transition temperature comprises 10% to 50% by weight of monomers whose homopolymers have Tg values above the lower glass transition temperature of polymer 1 or polymer 2, and
    the polymer of composition 1 or the polymer of composition 2 having a higher glass transition temperature comprises from 0% to 25% by weight of monomers whose homopolymers have Tg values below the higher glass transition temperature of polymer 1 or polymer 2.

13. The method of claim 1,
wherein the aqueous polymer dispersion has a minimum film formation temperature without addition of a film-forming assistant of <30° C.

14. The method of claim 1,
wherein the aqueous polymer dispersion is suitable for improving a handcream resistance.

15. A coating composition, in the form of an aqueous composition, the coating composition comprising
an aqueous polymer dispersion,
optionally at least one component selected from the group consisting of an inorganic filler, organic filler, inorganic pigment, and organic pigment,
optionally a customary auxiliary, and
water,
wherein the aqueous polymer dispersion is obtained by a method comprising
polymerizing a monomer composition 1 comprising a first monomer comprising an ethylenically unsaturated group, an adhesion monomer that is different from the first monomer and that comprises an ethylenically unsaturated group and nitrogen, and a further monomer that is different from the first monomer and that is selected from the group consisting of itaconic acid, acetoacetoxyethyl (meth)acrylate (AAEM), acrylonitrile, and a combination thereof by radical aqueous emulsion polymerization to a conversion of at least 90, based on the monomer composition 1 to be polymerized to yield a polymer 1, and
subsequently, in the presence of the polymer 1, polymerizing a monomer composition 2 comprising a second monomer comprising an ethylenically unsaturated group, optionally an adhesion monomer that is different from the second monomer and that comprises an ethylenically unsaturated group and nitrogen, and a further monomer that is different from the second monomer and that is selected from the group consisting of itaconic acid, acetoacetoxyethyl (meth)acrylate (AAEM), acrylonitrile, and a combination thereof by radical aqueous emulsion polymerization, to obtain an aqueous polymer dispersion wherein the monomer composition 1 is such that random copolymerization of the composition 1 alone would give a polymer 1 with a glass transition temperature $Tg1>0°$ C.;

the monomer composition 2 is such that random copolymerization of the composition 2 alone would give a polymer 2 with a glass transition temperature $Tg2>80°$ C.;

the difference between $Tg1$ and $Tg2$ is at least 50° C.;

the adhesion monomer is copolymerized in an amount of from 0.1% to 10% by weight, based on the total amount of monomers polymerized;

of the total amount of the adhesion monomers to be copolymerized, from 20 to 100 mol % are copolymerized in the polymerizing of monomer composition 1;

the polymer of composition 1 or the polymer of composition 2 having a lower glass transition temperature is present in an amount of from 60% to 90% by weight; and the further monomer which is different from these monomers and is selected from the group consisting of itaconic acid, acetoacetoxyethyl (meth)acrylate (AAEM), and acrylonitrile is copolymerized in an amount of from 0.2% to 25% by weight, based on the total amount of the monomers to be polymerized.

16. The coating composition of claim 15, which is an aqueous coating material.

17. The coating composition of claim 15, wherein the coating composition is a satin-gloss varnish.

18. A method of coating an article, the method comprising applying the coating composition of claim 15 to said article.

* * * * *